(12) United States Patent
Aoki (10) Patent No.: US 10,782,632 B1
(45) Date of Patent: Sep. 22, 2020

(54) IMAGE FORMING APPARATUS, DEVELOPER CONTAINER, DEVELOPER USE MANAGEMENT SYSTEM

(71) Applicant: TOSHIBA TEC KABUSHIKI KAISHA, Shinagawa-ku, Tokyo (JP)

(72) Inventor: Shunsuke Aoki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/534,226

(22) Filed: Aug. 7, 2019

(51) Int. Cl.
*G03G 15/08* (2006.01)
*G03G 15/00* (2006.01)

(52) U.S. Cl.
CPC ..... *G03G 15/0863* (2013.01); *G03G 15/5079* (2013.01)

(58) Field of Classification Search
None
See application file for complete search history.

(56) References Cited

U.S. PATENT DOCUMENTS

| | | | |
|---|---|---|---|
| 6,748,182 B2 | 6/2004 | Yoshida et al. | |
| 7,266,313 B2 | 9/2007 | Yokoi et al. | |
| 9,904,227 B2 | 2/2018 | Kanakubo | |
| 2002/0077979 A1* | 6/2002 | Nagata | G06Q 10/087 705/40 |
| 2008/0240745 A1* | 10/2008 | Hibino | G03G 15/553 399/24 |

* cited by examiner

Primary Examiner — Victor Verbitsky
(74) Attorney, Agent, or Firm — Amin, Turocy & Watson, LLP (57) ABSTRACT

According to one embodiment, an image forming apparatus includes a memory and a controller. The memory stores identification information for identifying an installed developer container and first information associated with the identification information. The controller refers to association information which is stored in a server connected for communication to at least one image forming apparatus and includes information associated with the identification information for identifying the developer container used in the image forming apparatus and second information associated with the identification information. The controller performs control related to use of developer based on a comparison result between the first information associated with the identification information and the second information associated with identification information when the same identification information as the identification information stored in the memory is included in the association information.

18 Claims, 5 Drawing Sheets

IMAGE FORMING APPARATUS, DEVELOPER CONTAINER, DEVELOPER USE MANAGEMENT SYSTEM

FIELD

Embodiments described herein relate generally to an image forming apparatus, a developer container, and a developer use management system.

BACKGROUND

Toner cartridges used once in multi-functional peripherals are reused in other multi-functional peripherals in some cases. When toner cartridges are reused, use contracts of the toner cartridges exchanged with former multi-functional peripherals need to be the same as use contracts of later multi-functional peripherals. However, in the related art, it is difficult to prevent toner cartridges used once in other multi-functional peripherals with different use contracts from being reused in multi-functional peripherals.

DETAILED DESCRIPTION

Embodiments provide an image forming apparatus, a developer container, and a developer use management system capable of preventing a developer restricted to use in terms of a use contract from being used.

In general, according to one embodiment, an image forming apparatus includes a memory and a controller. The memory stores identification information for identifying an installed developer container and first information associated with the identification information. The controller refers to association information which is stored in a server connected for communication to at least one image forming apparatus and includes information associated with the identification information for identifying the developer container used in the image forming apparatus and second information associated with the identification information. The controller performs control related to use of developer based on a comparison result between the first information associated with the identification information and the second information associated with identification information when the same identification information as the identification information stored in the memory is included in the association information.

Hereinafter, an image forming apparatus, a developer container, and a developer use management system according to an embodiment will be described with reference to the drawings.

Figure 1:
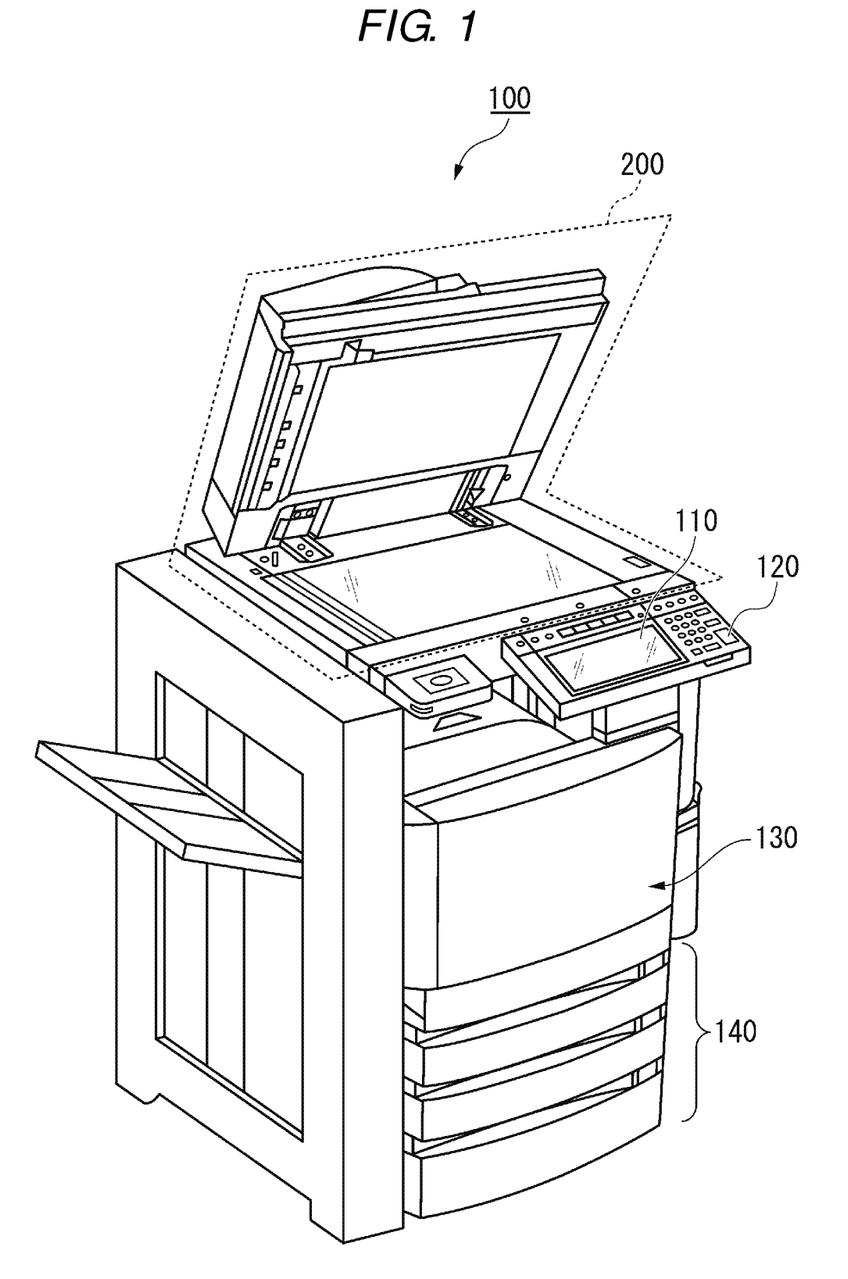
FIG. 1 is an external view illustrating an overall configuration example of an image forming apparatus according to an embodiment.

FIG. 1 is an external view illustrating an overall configuration example of an image forming apparatus 100 according to the embodiment. The image forming apparatus 100 is, for example, a multi-functional peripheral. The image forming apparatus 100 includes a display 110, a control panel 120, a printer 130, a sheet accommodation unit 140, and an image reading unit 200.

The image forming apparatus 100 forms an image on a sheet using developer including toner. A sheet is, for example, paper or a label sheet. The sheet may be anything as long as the image forming apparatus 100 can form an image on the surface of the sheet.

The display 110 is an image display device such as a liquid crystal display or an organic electro luminescence (EL) display. The display 110 displays various kinds of information regarding the image forming apparatus 100. The various kinds of information are, for example, information indicating the number of sheets on which images are formed.

The control panel 120 includes a plurality of buttons. The control panel 120 receives an operation from a user. The control panel 120 outputs a signal to a controller of the image forming apparatus 100 in response to an operation performed by the user. The display 110 and the control panel 120 may be configured as an integrated touch panel.

The printer 130 forms an image on a sheet based on image information generated by the image reading unit 200. The printer 130 may form an image on a sheet based on image information (online data) received via a communication line. The sheet on which the image is formed may be a sheet accommodated in the sheet accommodation unit 140 or may be a sheet manually inserted into the image forming apparatus 100.

The sheet accommodation unit 140 accommodates sheets used to form images in the printer 130. The image reading unit 200 (scanner) reads reading target image information based on lightness and darkness of light. The image reading unit 200 outputs the read image information to the printer 130. An image according to the recorded image information is formed on a sheet by the printer 130. The image reading unit 200 may output the read image information to another information processing apparatus via a network.

Figure 2:
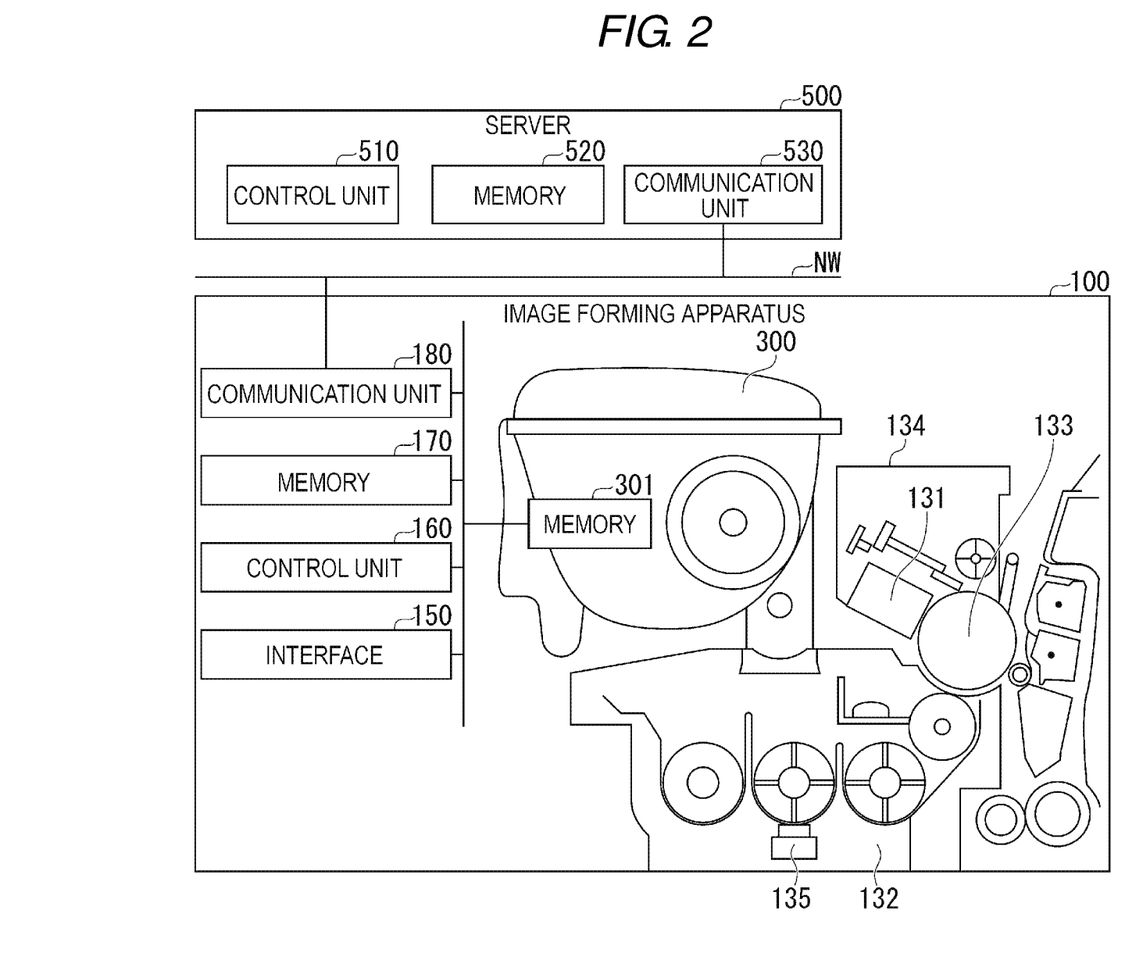
FIG. 2 is a diagram illustrating a configuration example of a developer use management system.

FIG. 2 is diagram illustrating a configuration example of the image forming apparatus 100 and a server 500 according to the embodiment.

The image forming apparatus 100 includes a charging device 131, a developing device 132, a photosensitive drum 133, a cleaning device 134, and a toner remaining amount detection sensor 135 as the printer 130. The image forming apparatus 100 includes an interface 150, a control unit 160 (controller), a memory 170, and a communication unit 180.

The charging device 131 forms an electrostatic latent image on the photosensitive drum 133 based on image information. The developing device 132 forms a visible image by attaching developer to the electrostatic latent image. The photosensitive drum 133 transfers the visible image to a sheet. A fixer unit of the printer 130 fixes the transferred visible image to the sheet by heating and pressurizing the sheet. The cleaning device 134 removes the remaining developer not transferred from the photosensitive drum 133.

The toner remaining amount detection sensor 135 measures a toner density of the developer. When the toner remaining amount detection sensor 135 detects that the toner density is low, a toner supply motor is driven. Thus, toner is supplied from a cartridge 300 to be described below to the body of the image forming apparatus 100.

When an output value of the toner density measured by the toner remaining amount detection sensor 135 is not a prescribed output value within a predetermined time, the image forming apparatus is determined to be in a state indicating the toner is depleted (hereinafter referred to as an "empty state").

In the embodiment, the image forming apparatus is determined to be in the empty state, but an exemplary embodiment is not limited thereto. For example, when a time necessary for the output value of the toner density measured by the toner remaining amount detection sensor 135 to reach the prescribed output value exceeds a predetermined time, the image forming apparatus may be determined to be in a state close to the empty state (hereinafter referred to as a near empty state).

The cartridge 300 (developer container) that contains developer is detachably mounted in the image forming apparatus 100. The cartridge 300 includes a memory 301. The memory 301 is, for example, a nonvolatile recording medium (non-transitory recording medium) such as flash memory. The memory 301 stores, for example, a data table.

The data table stored in the memory 301 includes, for example, identification information (for example, a serial number or the like) for identifying the cartridge 300 and information associated with an empty confirmation flag. The empty confirmation flag is a flag indicating whether developer contained in the cartridge 300 including the memory 301 is determined to be in the empty state.

The image forming apparatus 100 includes the interface 150, the control unit 160 (controller), and the memory 170.

When the cartridge 300 is installed in the image forming apparatus 100, the interface 150 transmits information stored in the memory 301 included in the cartridge 300 to the control unit 160. For example, when a front cover of the printer 130 is opened or closed, the interface 150 transmits identification information stored in the memory 301 to the control unit 160. For example, when it is detected that the image forming apparatus 100 is turned on, the interface 150 transmits identification information stored in the memory 301 to the control unit 160.

The control unit 160 (controller) controls an operation of each functional unit of the image forming apparatus 100. A part or the entirety of the control unit 160 is realized as software when a processor such as a central processing unit (CPU) executes a program stored in the memory 170. A part or the entirety of the control unit 160 may be realized using, for example, hardware such as large scale integration (LSI).

The control unit 160 acquires identification information transmitted by the interface 150. The control unit 160 acquires use contract information stored in the memory 170. The control unit 160 transmits the acquired identification information and use contract information to the server 500 via the communication unit 180 and a communication network NW.

The control unit 160 determines whether identification information stored in the memory 170 matches identification information stored in the memory 301. The control unit 160 reads a value of the empty confirmation flag stored in the memory 170. The control unit 160 performs various notifications (warnings) according to the determination result and the value of the empty confirmation flag.

The control unit 160 compares use contract information stored in a memory 520 included in the server 500 with the use contract information stored in the memory 170. The control unit 160 performs various notifications (warnings) according to a comparison result. According to the comparison result, the control unit 160 controls the image forming apparatus 100 such that the image forming apparatus 100 may not perform printing using the installed cartridge 300.

The memory 170 is, for example, a nonvolatile recording medium (non-transitory recording medium) such as flash memory. The memory 170 stores, for example, a program and a data table. The memory 170 may include, for example, a volatile recording medium such as dynamic random access memory (DRAM).

The data table stored in the memory 170 includes, for example, information associated with the identification information, the empty confirmation flag, and the use contract information. The identification information is identification information (for example, a serial number or the like) for identifying the cartridge 300.

The use contract information is for identifying a type of contract between a user and a provider of the image forming apparatus 100. For example, the use contract information is a contract number assigned to the contract, a commodity number assigned to a service, or the like.

The use contract information is not limited to a number. The use contract information may be, for example, a text string, a sign, or the like. The use contract information is not limited to information uniquely assigned to the user or the body of the image forming apparatus 100. For example, the use contract information may be the same information in the case of the same contract form.

The communication unit 180 is a communication interface connected for communication with the server 500 via the communication network NW.

The server 500 includes a control unit 510, a memory 520, and a communication unit 530.

The control unit 510 controls an operation of each functional block of the server 500. A part or the entirety of the control unit 510 is realized as software when a processor such as a CPU executes a program stored in advance in the memory 520. A part or the entirety of the control unit 510 may be realized using, for example, hardware such as LSI.

The memory 520 is, for example, a nonvolatile recording medium (non-transitory recording medium) such as flash memory. The memory 520 stores, for example, a program and a data table. The memory 520 may include, for example, a volatile recording medium such as DRAM.

The data table stored in the memory 520 includes, for example, information associated with identification information (for example, a serial number or the like) for identifying the cartridge 300 and the use contract information.

Whenever the new cartridge 300 is installed, the information associated with the identification information and the use contract information is accumulated as, for example, a list (association information) in the data table. The accumulated information may not be data with a list format as long as the accumulated information is associated with the identification information and the use contract information. Whenever the new cartridge 300 is installed in each of at least one image forming apparatus 100 connected for communication to the server 500, the information is accumulated as a list (association information).

The communication unit 530 is a communication interface connected for communication to at least one image forming apparatus 100 via the communication network NW.

When the control unit 160 of the image forming apparatus 100 determines that the image forming apparatus 100 is in the empty state, the empty confirmation flag is set in the data table stored in each of the memories 170 and 301. For example, the value of the empty confirmation flag is updated from "0" to "1."

Figure 3:
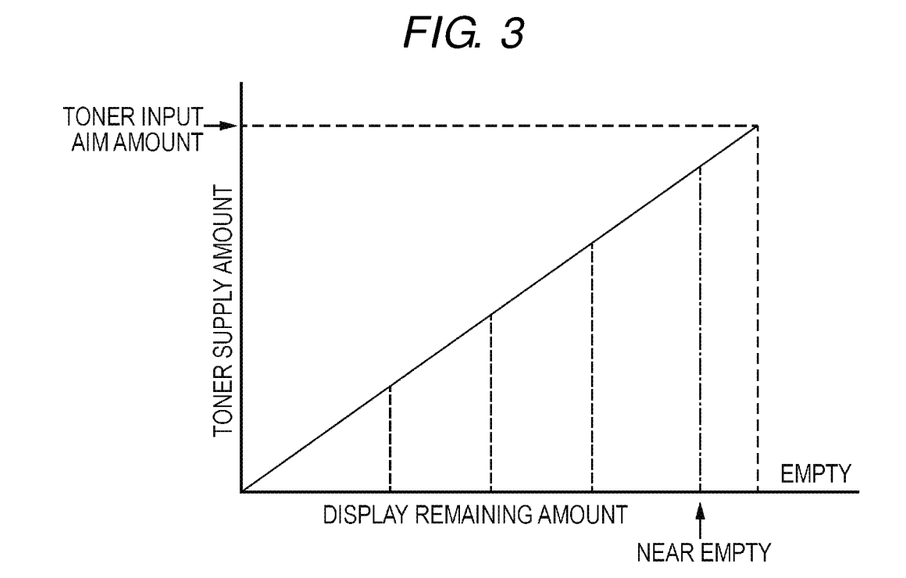
FIG. 3 is a diagram illustrating an example of a relation between a toner supply amount and notification control.

A relation between a toner supply amount and a driving time or a driving rotation number of the toner supply motor is known. The control unit 160 of the image forming apparatus 100 performs notification control such as notification indicating remaining amount display, the near empty state, or the empty state based on the toner supply amount and the toner input aim amount supposed from the relation. FIG. 3 is a diagram illustrating an example of a relation between a toner supply amount and notification control.

Figure 4:
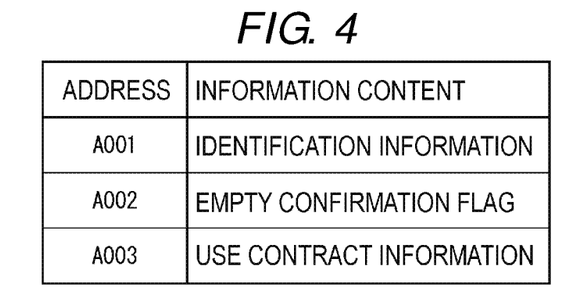
FIG. 4 is a diagram illustrating a disposition example of information of a data table in a memory of the image forming apparatus.

FIG. 4 is a diagram illustrating a disposition example of information of the data table in the memory 170. In the memory 170, a plurality of addresses (storage regions) is decided. In FIG. 4, for example, three addresses from "A001" to "A003" are decided in the memory 170.

In address "A001", identification information for identifying the cartridge 300 is stored. The identification information is identification information transmitted from the memory 301 of the cartridge 300 via the interface 150.

In address "A002", the empty confirmation flag is stored.

In address "A003", use contract information is stored. The use contract information is for example, information input in advance by a person in charge of operation and maintenance, for example, when the image forming apparatus 100 is initially set.

Figure 5:
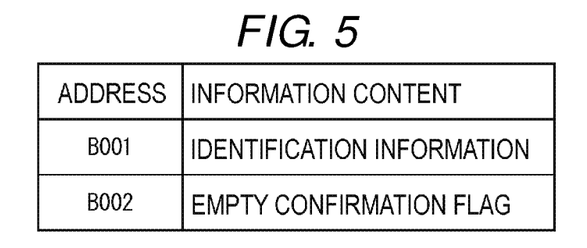
FIG. 5 is a diagram illustrating a disposition example of information of a data table in a memory of a cartridge.

FIG. 5 is a diagram illustrating a disposition example of information of a data table in the memory 301. In the memory 301, a plurality of addresses is decided. In FIG. 5, for example, two addresses of "B001" and "B002" are decided in the memory 310.

In address "B001," pre-decided identification information is stored. The identification information is identification information for identifying the cartridge 300 including the memory 301.

In address "B002", the empty confirmation flag is stored.

Figure 6:
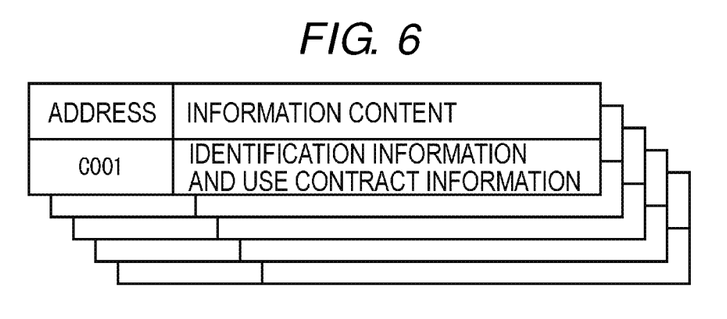
FIG. 6 is a diagram illustrating a disposition example of information of a data table in a memory of a server.

FIG. 6 is a diagram illustrating a disposition example of information of a data table in the memory 301. In the memory 301, one address is decided. In FIG. 6, for example, address "C001" is decided in the memory 301.

In address "C001", information associated with the identification information and the use contract information is stored. The information is generated whenever the new cartridge 300 is installed in the image forming apparatus 100 connected for communication to the server 500 and is accumulated as, for example, a list (association information). The information is associated with the identification information stored in the memory 301 included in the cartridge 300 and the use contract information stored in the memory 170 included in the image forming apparatus 100. The accumulated information may not be data with a list format as long as the information is associated with the identification information and the use contract information.

Next, an operation example of the image forming apparatus 100 will be described.

Figure 7:
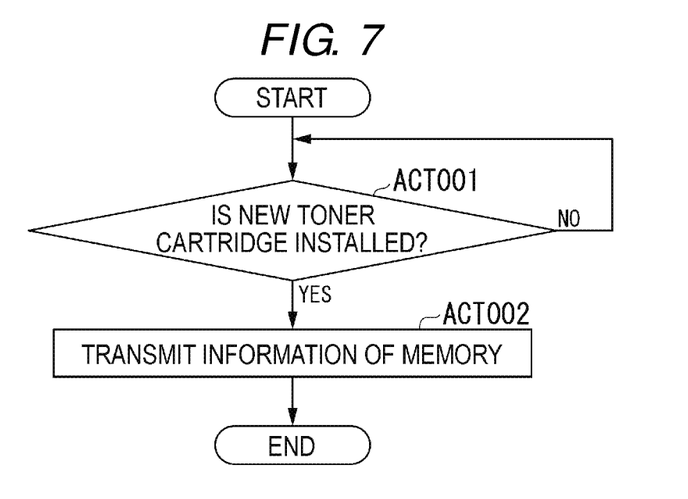
FIG. 7 is a flowchart illustrating an operation example when a new cartridge is installed in the image forming apparatus.

FIG. 7 is a flowchart illustrating an operation example when a new cartridge is installed in the image forming apparatus 100.

When it is detected that the new cartridge 300 is installed in the image forming apparatus 100 (Yes in ACT001), the interface 150 acquires the identification information stored in the memory 301 included in the cartridge 300 and transmits the identification information to the control unit 160.

The control unit 160 acquires the identification information transmitted from the interface 150 and the use contract information stored in the memory 170. The control unit 160 transmits the acquired identification information and use contract information to the server 500 via the communication unit 180 and the communication network NW (ACT002).

Then, the operation of the image forming apparatus 100 illustrated in the flowchart of FIG. 7 ends.

Figure 8:
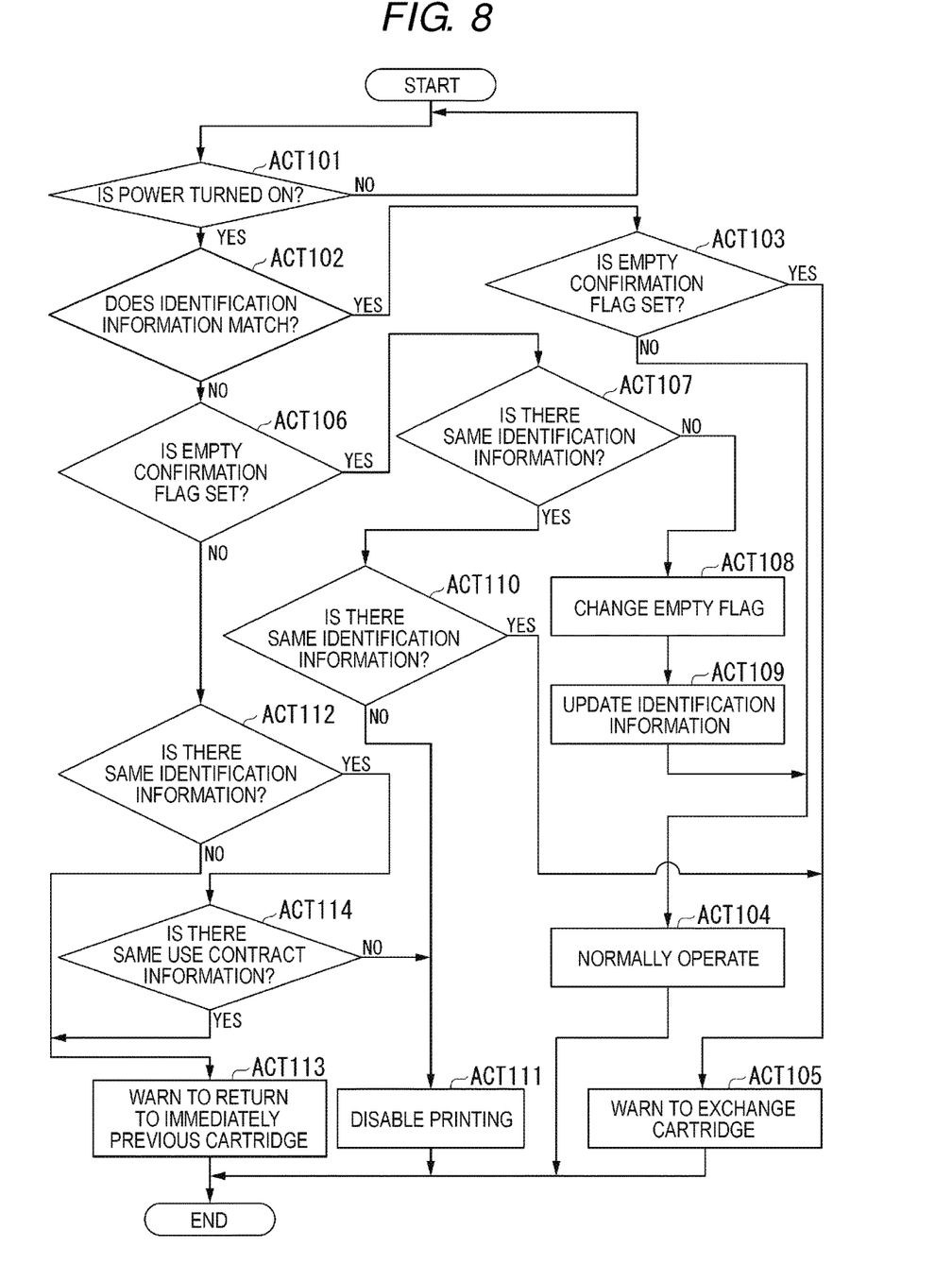
FIG. 8 is a flowchart illustrating an operation example when power is supplied to the image forming apparatus.

FIG. 8 is a flowchart illustrating an operation example when power is supplied to the image forming apparatus 100.

When the interface 150 detects that the image forming apparatus 100 is powered on (Yes in ACT101), the identification information stored in the memory 170 is compared with the identification information stored in the memory 301 of the cartridge 300 under the control of the control unit 160. That is, the control unit 160 determines whether the identification information of address "A001" of the memory 170 matches the identification information of address "B001" of the memory 301.

When the interface 150 detects that the front cover is opened or closed, the identification information may be compared. When the interface 150 detects that the image forming apparatus 100 returns from a sleep state and starts warming-up, the identification information may be compared.

When the identification information stored in the memory 170 matches the identification information stored in the memory 301 (Yes in ACT102), the control unit 160 reads the value of the empty confirmation flag stored in the memory 170. The case in which the identification information stored in the memory 170 matches the identification information stored in the memory 301 is, for example, a case in which the cartridge 300 is not exchanged in previous use of the image forming apparatus 100.

When the empty confirmation flag is not set (for example, the value of the empty confirmation flag is "0") (No in ACT103), the control unit 160 causes the image forming apparatus 100 to normally operate (ACT104).

When the empty confirmation flag is set (for example, the value of the empty confirmation flag is "1") (Yes in ACT103), the control unit 160 performs a warning to urge the user to exchange the cartridge 300 for a new cartridge (ACT105). For example, the control unit 160 causes the display 110 to display warning information indicating content of the warning.

When the identification information stored in the memory 170 does not match the identification information stored in the memory 301 (No in ACT102), the control unit 160 reads the value of the empty confirmation flag stored in the memory 170. The case in which the identification information stored in the memory 170 does not match the identification information stored in the memory 301 is, for example, a case in which the cartridge 300 is exchanged in previous use of the image forming apparatus 100.

When the empty confirmation flag is set (for example, the value of the empty confirmation flag is "1") (Yes in ACT106), the control unit 160 communicates with the server 500 via the communication network NW and refers to the identification information stored in the memory 520 included in the server 500. The control unit 160 compares the identification information stored in the memory 520 with the identification information stored in the memory 301 included in the cartridge 300.

When the same identification information as the identification information stored in the memory 301 is not in the data table stored in the memory 520 (No in ACT107), the control unit 160 changes the empty confirmation flag stored in the memory 170 to a state in which the empty confirmation flag is not set (for example, the value of the empty confirmation flag is updated to "0") (ACT108).

This is because the value of the empty confirmation flag stored in the memory 170 is a value corresponding to the cartridge 300 with different identification information (that is, the cartridge 300 before the exchange). Thus, the value of the empty confirmation flag stored in the memory 170 is a value corresponding to the installed cartridge 300.

When the empty confirmation flag is set (No in ACT106), the interface 150 acquires the identification information stored in the memory 301 included in the cartridge 300 and transmits the identification information to the control unit 160. The control unit 160 updates the identification information stored in the memory 170 according to the identification information transmitted from the interface 150 (ACT109).

This is because the value of the identification information stored in the memory 170 is the identification information associated with another cartridge 300 (that is, the cartridge 300 before the exchange). Thus, the identification information stored in the memory 170 is the identification information associated with the installed cartridge 300.

Then, the control unit 160 causes the image forming apparatus 100 to normally operate (ACT104).

When the same identification information as the identification information stored in the memory 301 is in the data table stored in the memory 520 (Yes in ACT107), the control unit 160 communicates with the server 500 via the communication network NW. The control unit 160 refers to the use contract information stored in the memory 520 included in the server 500. The use contract information referred to here is the use contract information associated with the above-described same identification information.

The control unit 160 compares the use contract information referred to (stored in the memory 520) with the use contract information stored in the memory 170.

When the use contract information stored in the memory 520 is the same as the use contract information stored in the memory 170 (Yes in ACT110), the control unit 160 performs a warning to urge the user to exchange the cartridge 300 for a new cartridge (ACT105). For example, the control unit 160 causes the display 110 to display warning information indicating content of the warning.

This is because the cartridge 300 already used in another image forming apparatus is supposed to be installed in the image forming apparatus 100. In this case, the image forming apparatus 100 may operate so that printing is disabled until the new cartridge 300 is installed. When the image forming apparatus 100 warns to exchange the cartridge 300 for the new cartridge 300, an input operation of not displaying a warning may be received from the user. In this case, the image forming apparatus 100 may operate so that printing is enabled when the input operation is performed.

When the use contract information stored in the memory 520 is not the same as the use contract information stored in the memory 170 (No in ACT110), the control unit 160 controls the image forming apparatus 100 such that printing in which the installed cartridge 300 is used is disabled (ACT111).

This is because the cartridge 300 which is not a use contract target which the user of the image forming apparatus 100 exchanges with the provider is supposed to be installed in the image forming apparatus 100.

When the empty confirmation flag is not set (No in ACT106), the control unit 160 communicates with the server 500 via the communication network NW and refers to the identification information stored in the memory 520 included in the server 500. The control unit 160 compares the identification information stored in the memory 520 with the identification information stored in the memory 301 included in the cartridge 300.

When the same identification information as the identification information stored in the memory 301 is not in the data table stored in the memory 520 (No in ACT112), the control unit 160 performs a warning (ACT113). The warning mentioned here is a warning for urging the user to return the cartridge 300 installed in the image forming apparatus 100 to the cartridge 300 installed immediately previously (used at the previous time). For example, the control unit 160 causes the display 110 to display warning information indicating content of the warning.

This is because the cartridge 300 installed immediately previously (used at the previous time) is supposed to be exchanged for the unused new cartridge 300 regardless of the fact that the empty confirmation flag is not set (that is, the empty state is not set).

When the same identification information as the identification information stored in the memory 301 is in the data table stored in the memory 520 (Yes in ACT112), the control unit 160 communicates with the server 500 via the communication network NW. The control unit 160 refers to the use contract information stored in the memory 520 included in the server 500. The use contract information referred to here is the use contract information associated with the above-described same identification information.

The control unit 160 compares the use contract information referred to (stored in the memory 520) with the use contract information stored in the memory 170.

When the use contract information stored in the memory 520 is the same as the use contract information stored in the memory 170 (Yes in ACT114), the control unit 160 performs a warning (ACT113). The warning mentioned here is a warning for urging the user to return the cartridge 300 installed in the image forming apparatus 100 to the cartridge 300 installed immediately previously (used at the previous time). For example, the control unit 160 causes the display 110 to display warning information indicating content of the warning.

This is because the cartridge 300 installed immediately previously (used at the previous time) is supposed to be exchanged for another cartridge 300 used previously regardless of the fact that the empty confirmation flag is not set (that is, the empty state is not set).

When the use contract information stored in the memory 520 is not the same as the use contract information stored in the memory 170 (No in ACT114), the control unit 160 controls the image forming apparatus 100 such that printing in which the installed cartridge 300 is used is disabled (ACT111).

This is because the cartridge 300 which is not a use contract target which the user of the image forming apparatus 100 exchanges with the provider is supposed to be installed in the image forming apparatus 100.

The case in which the cartridge is not the use contract target is, for example, a case in which the cartridge 300 installed in the image forming apparatus 100 is the cartridge 300 used by another user. The case in which the cartridge is not the use contract target is, for example, a case in which the cartridge 300 has another type of contract.

The case in which the contract type is different is, for example, a case in which the cartridge 300 which is a counter maintenance contract target is installed regardless of the fact that a spot maintenance contract is made.

The spot maintenance contract is a contact in which the user purchases the cartridge 300 for use. In the case of the spot maintenance contract, when toner is insufficient, it is necessary for the user to separately purchase the new cartridge 300. The counter maintenance contract is a contract in which the cartridge 300 is exchanged free of charge when toner is insufficient. In the case of the counter maintenance contract, the user is charged for a use fee according to the number of printed sheets.

Accordingly, it is not contractually desirable to use a toner cartridge which is a target of the counter maintenance contract regardless of the spot maintenance contract which is made.

Then, the operation of the image forming apparatus 100 illustrated in the flowchart of FIG. 8 ends. For example, the following operation is considered as an operation that continues after the foregoing operation.

For example, when a warning is performed to return to the immediately previous cartridge 300, the image forming apparatus 100 may operate so that printing is disabled until the immediately previous cartridge 300 is installed again. When a warning is performed to return to the immediately previous cartridge 300, the image forming apparatus 100 may receive an input operation of not displaying the warning from the user. In this case, the image forming apparatus 100 may operate so that printing is enabled when the input operation is performed.

As described above, the image forming apparatus 100 according to the above-described embodiment includes the memory 170 and the control unit 160 (a controller). The memory 170 stores the identification information for identifying the installed cartridge 300 (a developer container) and the use contract information (first information) associated with the identification information. The control unit 160 (the controller) refers to the list (association information) which is stored in the server 500 connected for communication to at least one image forming apparatus 100 and includes information associated with the identification information for identifying the cartridge 300 (the developer container) used in the image forming apparatus 100 and the use contract information (second information) associated with the identification information. The control unit 160 (the controller) performs control related to use of developer (for example, toner) based on a comparison result between the first information associated with the identification information and the second information associated with identification information when the same identification information as the identification information stored in the memory 170 is included in the list (the association information).

In the foregoing configuration, the image forming apparatus 100 according to the above-described embodiment can refer to the use contract information stored in the server 500. Thus, the image forming apparatus 100 can check whether the installed cartridge 300 is restricted to use in terms of the use contract. Then, the image forming apparatus 100 can prevent developer restricted to use in terms of the use contract from being used.

The memory 170 of the image forming apparatus 100 according to the above-described embodiment further stores the empty confirmation flag indicating the decrease in the remaining amount of the developer. In the foregoing configuration, the image forming apparatus 100 according to the above-described embodiment can prevent the cartridge 300 in which the remaining amount of the developer does not decrease from being exchanged for another cartridge 300.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
a non-transitory memory configured to store identification information for identifying an installed developer container and first information associated with the identification information;
a processor configured to refer to association information which is stored in a server connected for communication to at least one image forming apparatus, wherein the association information includes the first information associated with the identification information for identifying the installed developer container and second information associated with the identification information, and facilitate use of a developer based on a comparison result between the first information and the second information when the identification information stored in the memory is the same identification information included in the association information,
wherein the processor facilitates sending a notification to urge a user to install a developer container corresponding to the identification information stored in the memory when the identification information is different from the identification information stored in the memory and the information indicates a decrease in a remaining amount of developer that is not stored in the memory.

2. The apparatus according to claim 1, wherein the first information and the second information include at least one of use contract information of the developer and information for identifying a service provider able to use the developer.

3. The apparatus according to claim 1, wherein the processor performs control such that the developer is not usable when the first information associated with the identification information is different from the second information associated with the identification information.

4. The apparatus according to claim 1, wherein the processor further acquires acquired identification information for identifying the developer container which is stored in a separate container included in the developer container, and
when the acquired identification information is different from the identification information stored in the memory, the processor updates the identification information stored in the memory according to the acquired identification information.

5. The apparatus according to claim 4, wherein the memory is further configured to store information indicating a decrease in the remaining amount of the developer, and when the acquired identification information is different from the identification information stored in the memory, the processor erases the information indicating the decrease in the remaining amount stored in the memory.

6. The apparatus according to claim 5, wherein
when power is supplied to the image forming apparatus, or an insertion port of the developer container in the image forming apparatus is opened or closed, the processor compares the acquired identification information with the identification information stored in the memory.

7. The apparatus according to claim 5, wherein
the information indicating the decrease in the remaining amount is information indicating that the developer contained in the developer container is depleted or information indicating that the developer contained in the developer container is nearly depleted.

8. A developer container installed in the apparatus according to claim 7, the developer container comprising:
the separate container configured to store identification information for identifying a developer container of the separate container which is transmitted to each of the server and the image forming apparatus.

9. A developer use management system including a server and at least one image forming apparatus, wherein
the server comprises a server storage device that stores association information including first information associated with identification information for identifying a developer container used in the image forming apparatus and second information associated with the identification information, and
the image forming apparatus comprises:
a non-transitory memory that stores identification information for identifying an installed developer container and the first information associated with the identification information; and
a processor that controls use of a developer based on a comparison result between the first information and the second information when the identification information stored in the memory is the same identification information included in the association information, wherein
wherein the processor facilitates sending a notification to urge a user to install a developer container corresponding to the identification information stored in the memory when an acquired identification information is different from the identification information stored in the memory and the acquired information indicates a decrease in a remaining amount of developer is not stored in the memory.

10. The system according to claim 9, wherein
the first information and the second information include at least one of use contract information of the developer and information for identifying a service provider able to use the developer.

11. The system according to claim 9, wherein
the processor performs control such that the developer is not usable when the first information is different from the second information.

12. The system according to claim 9, wherein
the processor further acquires the acquired identification information for identifying the developer container which is stored in a separate container included in the developer container, and
when the acquired identification information is different from the identification information stored in the memory, the processor updates the identification information stored in the memory according to the acquired identification information.

13. The system according to claim 12, wherein
the memory is further configured to store information indicating the decrease in a remaining amount of the developer, and
when the acquired identification information is different from the identification information stored in the memory, the processor erases the information indicating the decrease in the remaining amount stored in the memory.

14. The system according to claim 13, wherein
when power is supplied to the image forming apparatus, or an insertion port of the developer container in the image forming apparatus is opened or closed, the processor compares the acquired identification information with the identification information stored in the memory.

15. The system according to claim 13, wherein
the acquired information indicating the decrease in the remaining amount is information indicating that the developer contained in the developer container is depleted or information indicating that the developer contained in the developer container is nearly depleted.

16. The system according to claim 9, wherein the acquired identification information is first acquired identification information,
the server further acquires second acquired identification information for identifying the developer container which is stored in a separate container included in the developer container, and
when the second acquired identification information is different from the identification information stored in the memory, the server updates the identification information stored in the memory according to the second acquired identification information.

17. The system according to claim 16, wherein
the memory is further configured to store information indicating a decrease in a remaining amount of the developer, and
when the second identification information is different from the identification information stored in the memory, the server erases the information indicating the decrease in the remaining amount stored in the memory.

18. The system according to claim 17, wherein
when power is supplied to the image forming apparatus, or an insertion port of the developer container in the image forming apparatus is opened or closed, the server compares the second acquired identification information with the identification information stored in the memory.

* * * * *